Oct. 25, 1932.     F. MENZEL     1,884,071
ELECTRIC STORAGE BATTERY
Filed Aug. 9, 1927
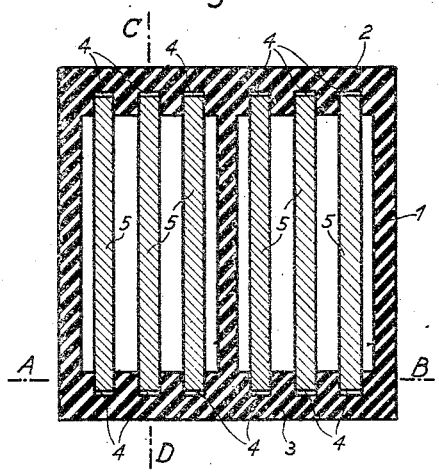
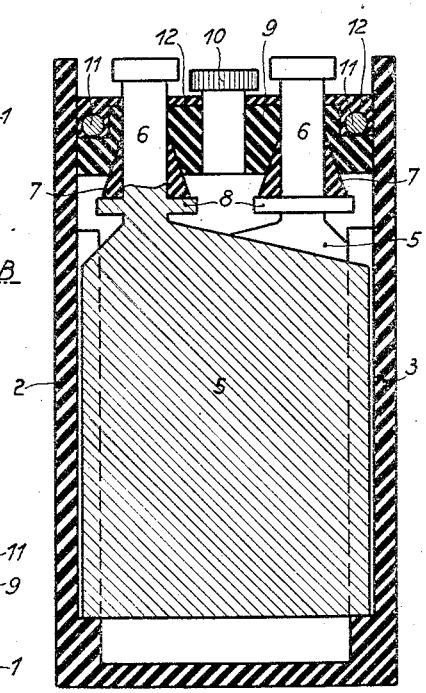
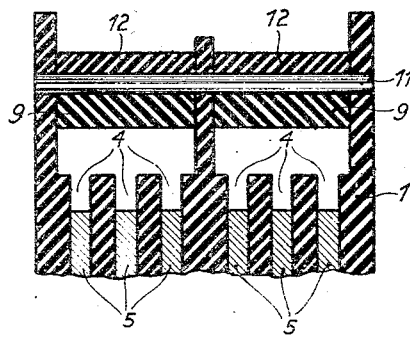
Inventor
Friedrich Menzel
by Steward & McKay
his attorneys Patented Oct. 25, 1932

1,884,071

UNITED STATES PATENT OFFICE

FRIEDRICH MENZEL, OF STUTTGART, GERMANY, ASSIGNOR TO ROBERT BOSCH AKTIENGESELLSCHAFT, OF STUTTGART, GERMANY

ELECTRIC STORAGE BATTERY

Application filed August 9, 1927, Serial 211,741, and in Germany January 11, 1927.

This invention relates to improvements in electric storage batteries.

The plates in batteries for vehicles are particularly liable to damage due to the jolts to which they are subjected during travel. In order to protect the plates they have usually been clamped between corrugated or porous dividing plates so-called separators. These however impede the circulation of the acid, and take up a portion of the space otherwise occupied thereby, without absolutely preventing the plates from rocking to and fro, so that fractures may nevertheless occur at the junctures of the plates to the terminal lugs and connecting bars.

In order to avoid these disadvantages, the plates are according to the invention guided along their edges and held by pressure longitudinally so that they are protected against rocking to and fro in the cell when shocks are set up during the running of the vehicle on which they may be carried. The separators arranged between the plates can consequently be omitted.

One form of construction of the invention is shown in the drawing.

Figure 1 is a horizontal section through a battery vessel.

Figure 2 is a longitudinal section along the line A—B in Figure 1.

Figure 3 is a longitudinal section along the line C—D in Figure 1.

Two opposite sides 2 and 3 of a two-cell battery 1 of vulcanized rubber are thickened to a predetermined degree and longitudinal grooves 4 are cut out of the thickened portions, the lower ends of these grooves forming a support or lower abutment spaced from the base of the vessel. An accumulator plate 5 is inserted from above into each pair of grooves. Conical rubber stoppers 7 which abut against the connecting bars 8 of the plates are then pushed over the terminal lugs 6 of the plates 5. The top of each cell is closed by a cover 9 which is bored corresponding to the terminal lugs 6 and the rubber stoppers 7 and is provided with an opening for filling the accumulator with acid which opening can be closed by means of a stopper 10. The two cell covers 9 are forced, by means of two bars 11 which are guided in holes in the cell walls, against the rubber buffers 7 mounted on the plates 5 so that the latter are firmly pressed against the supporting surfaces formed by the lower ends of the longitudinal grooves 4. The cell covers 9 are sealed up by a plastic mass 12.

The plates 5 are secured against rocking to and fro in the battery vessel 1 by the longitudinal grooves 4 whose sides and bottoms form abutments limiting the lateral and downward movement of the plates. Even when the plates do not fit firmly in the longitudinal grooves as shown, but are mounted with slight play therein, they are still unable to rock to and fro to an appreciable degree. As the plates are forced against their support by the cell covers 9, they are thereby not only prevented from longitudinal displacement in the grooves, but from any movement whatsoever.

Instead of guiding the plates on two vertical edges as shown, it may be sufficient to retain them only over one single edge, for example to insert the lower horizontal edge in a horizontal groove in the lower portion of the cell. As the plates can be securely held by the cell cover, they are prevented from rocking to and fro in the horizontal grooves. Moreover suitable wedges or the like can be used instead of the grooves shown to retain the edges.

In all cases, the separators hitherto used for retaining the plates are no longer necessary. The plates stand absolutely freely in the acid apart from the narrow grooved portions.

I claim:

1. A storage battery comprising in combination, a casing, a plurality of positive and negative plates vertically arranged in said casing, spaced abutments within the casing and arranged to limit the lateral and downward movement of said plates, connecting bars and terminal lugs for said positive plates and said negative plates, conical resilient stoppers mounted on said terminal lugs with their bases abutting said connecting bars, closure means for said casing having apertures arranged to receive said terminal lugs and stoppers and each of a diameter intermediate the diameters of the top and base of said stoppers, said closure means being arranged to fit within the casing and rest upon said stoppers independently of the walls of the casing, and means acting between the casing and said closure means to force the closure means down upon said stoppers to resiliently clamp the plates down against said abutments through said stoppers.

2. A storage battery comprising in combination, a casing, positive and negative plates vertically arranged in said casing, said casing being provided with vertically extending grooves in the interior thereof and in which grooves said plates are arranged, means adjacent the bottom of said casing for supporting said plates, closure means for said casing, resilient means between said closure means and said plates, and means acting between said casing and said closure means to hold the closure means down upon said resilient means and retain the latter under compression, said grooves serving to hold said plates in spaced relation and to prevent buckling under compression by said resilient means.

3. A storage battery comprising in combination, a casing, positive and negative plates vertically arranged in said casing, said casing being provided with vertically extending grooves in the interior thereof and embracing opposite edges of said plates, said grooves extending only part way to the bottom of said casing to allow the bottoms of said grooves to form supporting abutments for said plates, terminal lugs on said plates, resilient washers mounted on said lugs, a cover for said casing engaging said washers, members anchored in the walls of said casing to hold the cover against said resilient washers and retain the latter under compression and thereby press said plates against said abutments, said grooves serving to hold said plates in spaced relation and prevent buckling under compression.

4. A storage battery comprising in combination, a casing, positive and negative plates vertically arranged in said casing, said casing being provided with vertically extending grooves in the interior of said casing, said plates being arranged in said grooves, said grooves extending only part way to the bottom of said casing to allow the bottom of said grooves to form supporting abutments for said plates, terminal lugs on said plates, resilient washers mounted on said lugs, a cover for said casing, bars anchored in holes in the casing wall and engaging the outside of the cover, the latter being held against said resilient washers on said lugs to retain the said washers under compression and thereby press said plates against said supporting abutments, said grooves serving to hold said plates in spaced relation and prevent buckling under compression.

5. A storage battery as claimed in claim 4, in which the outside of the cover is formed with recesses for receiving said bars.

In testimony whereof I have hereunto affixed my signature.

FRIEDRICH MENZEL.